United States Patent [19]
Miyamoto

[11] 3,764,245
[45] Oct. 9, 1973

[54] APPARATUS FOR PRODUCING LIGHT STRUCTURAL BOARD OF THERMOPLASTIC RESIN

[76] Inventor: Fumio Miyamoto, Kodaira City, Tokyo, Japan

[22] Filed: May 10, 1971

[21] Appl. No.: 141,808

[52] U.S. Cl.................. 425/131, 425/4, 425/382
[51] Int. Cl.............................................. B29d 7/04
[58] Field of Search.................. 425/131, 4, 4 C, 425/380, 382, 130, 133

[56] References Cited
UNITED STATES PATENTS

| | | | |
|---|---|---|---|
| 3,448,183 | 6/1969 | Chisholm | 425/131 X |
| 3,117,342 | 1/1964 | Koppehele | 264/177 R X |
| 3,274,315 | 9/1966 | Kawamura | 264/209 X |
| 3,321,804 | 5/1967 | Breidt et al. | 425/131 |
| 3,477,099 | 11/1969 | Lee et al. | 425/131 |
| 3,019,483 | 2/1962 | Schultheiss | 264/171 X |
| 3,443,278 | 5/1969 | Nauta | 425/131 |
| 3,606,636 | 9/1971 | Glass et al. | 425/131 |
| 3,444,031 | 5/1969 | Schrenk | 425/131 X |
| 3,557,265 | 1/1971 | Chisholm et al. | 425/4 X |

Primary Examiner—J. Spencer Overholser
Assistant Examiner—B. D. Tobor
Attorney—Waters, Roditi, Schwartz & Nissen

[57] ABSTRACT

An apparatus is disclosed which is adapted to produce a light structural board of thermo plastic resin, consisting of a plurality of inside plate and inner and outer layers which are secured together through a number of spaced ribs or partitions which are integral with the outer layers.

13 Claims, 8 Drawing Figures

APPARATUS FOR PRODUCING LIGHT STRUCTURAL BOARD OF THERMOPLASTIC RESIN

This invention relates to an apparatus for producing a light structural board of synthetic resin.

SUMMARY OF THE INVENTION

An object of this invention is to provide an apparatus for continuously producing a light structural board of thermoplastic synthetic resin at a low cost.

Another object of this invention is to provide an apparatus for producing a light structural board of thermoplastic resin having a plurality of layers which are secured together through spaced ribs or partitions of a resin which is homogeneous or heterogeneous to the material forming the remaining layers and/or which have the same or different colors.

These objects of the present invention will be accomplished by an apparatus which comprises in combination first and second sources of heat-plastified thermoplastic resin, first and second passage means leading respectively from the first and second sources and extending in directions which are substantially perpendicular to each other, a die formed with a cavity which has an inlet end leading from the first passage means and an outlet end located opposite to and substantially in line with the inlet end and extending in a slot form which is substantially perpendicular to the first passage means, a mandrel positioned within the cavity in the die and formed with an elongated cavity leading from the second passage means and extending in a direction substantially parallel to the outlet end of the cavity in the die, the mandrel being further formed with at least one discharge passageway leading from the elongated cavity and terminating in proximity to and in parallel to the outlet end of the cavity in the die, the die and mandrel defining therebetween a pair of parallel discharge passageways forming part of the cavity in the die and spaced apart from each other across a forward end portion of the mandrel, the parallel passageways approaching each other to form a pair of spaced parallel slots at outlet end of the discharge passageway in the mandrel, and a plurality of rib-forming elements located in proximity to the slots between the die and mandrel and to the outlet end of the discharge passageway in the mandrel. The rib-forming elements may be fast on the opposed outer surfaces of the mandrel and have a plurality of teeth projecting into the spaced parallel passageways close to the slots and to the outlet end of the discharge passageway in the mandrel. Otherwise, the rib-forming elements may be fast on those surfaces of the mandrel which define the outlet end of the discharge passageway in the mandrel, wherein the rib-forming elements are formed with slots which are spaced apart from each other in a direction parallel to the slots between the die and mandrel and each of which extend in a direction perpendicular to the slots and to the outlet end of the discharge passageway in the mandrel.

The invention will be more clearly illustrated in the following detailed description, especially when taken in connection with the accompanying drawings, which show, by way of example only, preferred embodiments of the invention.

Figure 2:
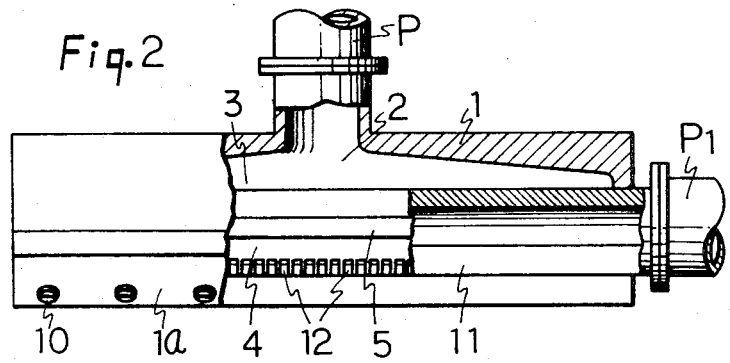
Figure 4:
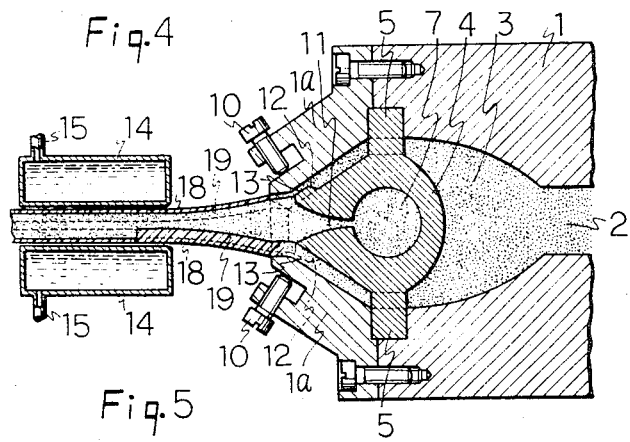
FIG. 4 is a cross-sectional view of the extrusion unit illustrated in the FIG. 2.
Figure 6:
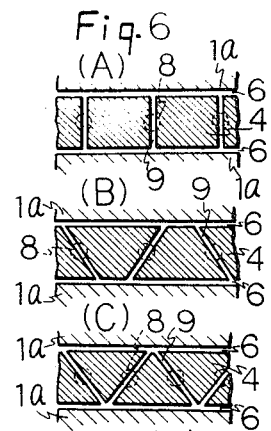
FIG. 6 is a view showing, on an enlarged scale, preferred examples of the cross sectional configurations of the ribforming elements incorporated in the extrusion unit having the construction illustrated in FIGS. 1 and 3.
Figure 7:
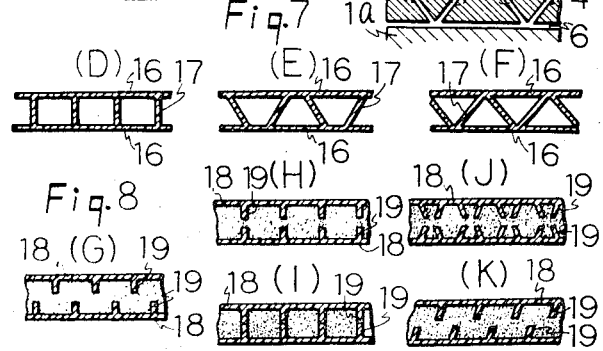
Figure 8:
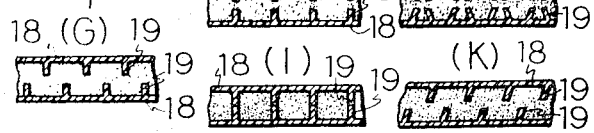

FIG. 7 is a view showing cross sectional configurations of the light structural boards produced with use of the extrusion units using the rib-forming elements shown in FIG. 6; and FIG. 8 a view showing, on an enlarged scale, preferred examples of the cross sectional configuration of the light structural board produced with use of the extrusion unit having the general construction illustrated in FIGS. 2 and 4.

Figure 1:
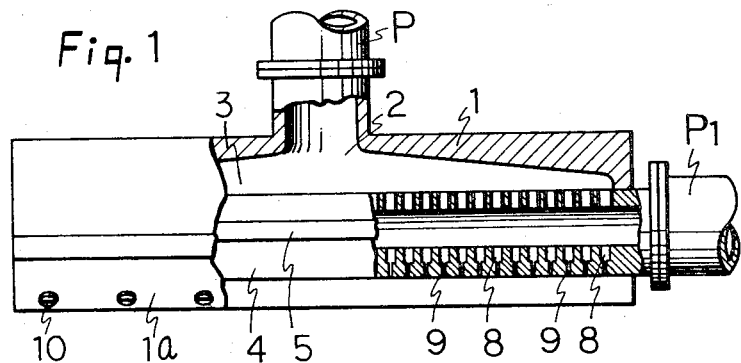
FIGS. 1 and 2 are cut-away views showing constructions of extrusion units each forming part of the apparatus according to the present invention.
Figure 3:
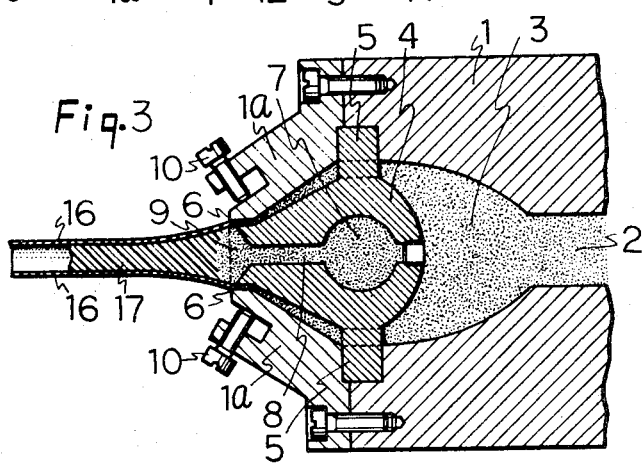
FIG. 3 is a cross-sectional view of the extrusion unit illustrated in the FIG. 1.

Reference will now be made to the drawings, and first more particularly to FIGS. 1, 3 and 5. The extrusion unit of the apparatus according to the present invention comprises a die having an elongated cavity 3 which is in communication through a passageway 2 with a source P of a heat-plastified thermoplastic resin. The passageway 2 opens into the cavity 3 in a direction substantially perpendicular to the cavity. The cavity 3 thus merging from the passageway 2 is open at its end opposite to the outlet of the passageway 2 and forms an elongated slot which is defined by spaced foremost edges of lip portions 1a of the die 1, as best seen in FIG. 3. A mandrel or inner die block 4 is positioned within the cavity 3 in the die 1 and secured to the die 1 through a spider 5 which is integral with the mandrel. The mandrel 4 extends throughout the entire length of the elongated cavity 3 in the die in such a manner that a pair of spaced passageways are formed between opposed inner surfaces of the die 1 defining the cavity 3 and opposed outer surfaces of the mandrel 4. These passageways approach each other toward the slot between the foremost edges of the lip portions of the die 1, thereby forming a pair of spaced slots 6 which extend in parallel to the elongated cavity 3 and accordingly perpendicular to the direction in which the passageway 2 opens into the cavity 3, as clearly seen in FIG. 1.

The mandrel 4 is formed with a cavity 7 which is elongated in parallel to the direction in which the cavity 3 in the die 1 extends. The elongated cavity 7 in the mandrel 4 is in communication with another source $P_1$ of plastified thermoplastic resin and opens into the slot between the foremost edges of the lip portions 1a of the die 1 through a plurality of discharge passageways 8 and slots 9. The slots 9 merge from the discharge passageways 8 and into the spaced parallel slots 6 at their foremost ends.

Figure 5:
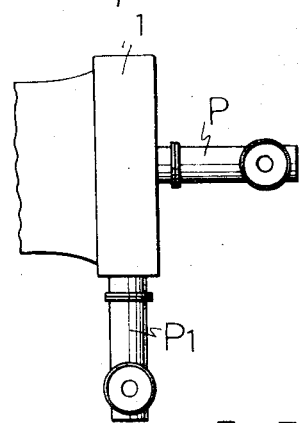
FIG. 5 is a schematic plan view an overall construction of the apparatus according to the present invention incorporating the extrusion unit shown in FIGS. 1 and 3 or FIGS. 2 and 4 with the metal die and a plurality of an extruding machines.

The sources P and $P_1$ of the heat-plastified thermoplastic resin are positioned at a right angle to each other so that the heat-plastified thermoplastic resins are fed into the elongated cavities 3 and 7 in the die 1 and mandrel 4, respectively, in directions which are substantially perpendicular to each other as seen in FIG. 5. The materials thus supplied from the sources P and $P_1$ may be either homogeneous or heterogeneous to each other and/or have the same or different colors. In the description to follow, the material to be fed into the cavity 7 in the mandrel 4 is assumed to be a foaming thermoplastic resin. Where, thus, the foaming thermoplastic resin is to be extruded from the mandrel 4, the discharge passageways 8 and/or slots 9 may preferably be forwardly enlarged so as to allow the foaming material to foam and expand as it advances toward outlet ends of the slots 9 as eill be discussed later. Designated by reference numeral 10 are adjusting bolts for varying the spacings between the inner surfaces of the lip portions 1a of the die 1 and the outer surfaces of the mandrel 4, and accordingly the widths of the spaced parallel slots 6.

The heat-plastified thermoplastic resins are fed constantly and continuously into the elongated cavities 3 and 7 in the die 1 and mandrel 4, respectively, in directions which are perpendicular to each other. The thermoplastic resin thus admitted to the cavity 3 through the passageway 2 is diverted by a rear end wall portion of the mandrel 4 into the spaced passageways which are defined between the inner surfaces of the die 1 and the outer surfaces of the mandrel 4. To facilitate the diverging of the stream of thermoplastic resin into these spaced passageways, the rear end wall portion of the mandrel 4 may be rounded as illustrated in FIG. 3. The streams of the thermoplastic resin are then discharged from the passageways through the elongated parallel slots 6, thereby forming webs 16 which are spaced apart from each other. On the other hand, the heat-plastified thermoplastic resin delivered into the elongated cavity 7 in the mandrel 4 is separated into a plurality of streams as it is forced through the discharge passageways 8. These streams are discharged from the passageways 8 through the spaced slots 9 in the form of a plurality of strips 17 which have their longitudinal edges adjacent the inner surfaces of the spaced parallel webs 16. Where thermoplastic resin of a foaming natuer is fed to the mandrel 4, the resin will be allowed to expand and foam as the streams of the resin advance through the discharge passageways 8 and slots 9.

The spaced strips 17 thus emerging out of the slots 9 are contacted at their longitudinal edges by the inner surfaces of the webs 16 and are fused thereto to form an integral board consisting of a pair of external layers resulting from the webs 16 and an inner layer resulting from the strips 17. The light structural board thus produced is cooled and set and continuously fed forwardly by suitable take-up means (not shown).

The rib-forming elements are, in the extrusion unit above described, constituted by wall sections of the mandrel forming the spaced slots 9. These slots 9 may be at right angles to the spaced parallel slots 6 defined by the foremost edges of the lip portions 1a of the die as in an example (A) shown in FIG. 6 or inclined to the slots 6 alternately in different directions as in examples (B) and (C) shown in FIG. 6. The configuration of the slots 8 in these examples (A), (B) and (C) will result in the cross-sectional configurations (D), (E) and (F), respectively, of the light structural board shown in FIG. 7.

A modification of the extrusion unit above described is illustrated in FIGS. 2 and 4. While the rib-forming elements are formed on the mandrel 4 in the extrusion unit shown in FIGS. 1 and 3, the mandrel 4 incorporated in the modified extrusion unit shown in FIGS. 2 and 4 has a discharge passageway 11 which extends in parallel to and throughout the length of the elongated cavity 7 in the mandrel 4. The mandrel 4 is formed with a number of teeth 12 projecting into the spaced passageways between the inner surfaces of the die 1 and extending substantially perpendicularly to spaced parallel slots 13 which are formed at the leading ends of the passageways between the die 1 and mandrel 4. The slots 13 are thus formed between the opposed inner surfaces of the die 1 and the toothed outer surfaces of the mandrel 4 so that the streams of the heat-plastified thermoplastic resin extruded out of the slots 13 form a pair of spaced webs 18 which are formed on their inner surfaces a plurality of ribs 19 which are spaced from each other and which continuously extend lengthwise of the webs 18. While the streams of thermoplastic are thus extruded from the slots 13, the heat-plastified thermoplastic resin fed into the cavity 7 in the mandrel 4 is forced out of the discharge passageway 11 extending throughout the length of the elongated cavity 3 in the die 1 and forms a web having smooth surfaces. This web is contacted by the spaced outer webs 16 so that the ribs 19 projecting from the inner surfaces of the webs are embedded in or seized by the former, thereby forming an integral board with external layers resulting from the webs extruded from the slots 13 and an internal layer resulting from the web extruded from the discharge passageway. The integral board is then passed through a cooling unit 14 in which a cooling medium such as water is constantly circulated through conduits 15.

The teeth 12 formed on the outer surfaces of the mandrel 4 may project from the surfaces at right angles so that the ribs 19 on the extruded webs 18 project perpendicularly from the inner surfaces of the webs as in examples (G), (H) and (I) of the sectional configuration of the board shown in FIG. 8. Otherwise, the teeth 12 may be suitably inclined to the outer surfaces of the mandrel 4 so that the ribs 19 on the extruded webs 18 are accordingly inclined to the inner surfaces of the webs as in examples (J) and (K) of the sectional configuration of the board shows in FIG. 8. Furthermore, the teeth 12 on one outer surface of the mandrel 4 may be in alignment with those on the other surface of the mandrel so that the ribs 19 on one of the webs 18 are in registry with the ribs 19 on the other web 18 as in the examples (H), (I) and (J). In this instance, the teeth 12 may be so sized as to provide the sectional configuration of the board in which the aligned ribs on both webs are combined together at their tops as in the example (I). Otherwise, the teeth 12 may be so located that the resultant ribs 19 on the two webs 18 are in staggered relation as in the examples (G) and (K) shown in FIG. 8.

As previously mentioned, the thermoplastic resins to form the external layers and the internal layer of the light structural board may be either homogeneous or heterogeneous to each other and/or have a common color or different colors. The light structural board produced by the apparatus according to the present invention will thus provide an enhanced aesthetic value through selection of the material or materials to be used and will lend itself to various practical pruposes as, for example, packaging materials or heat or acoustic insulators.

The extrusion units of the embodiments thus far described have been assumed to be using a die and mandrel of the T-types, but other types of extruders such as fish-tail or screw type extruders or any combination of them may be utilized for extruding outer and inner webs to form the light structural board of the described construction. For example, a die of the fishtail type may be combined with a mandrel of the T-type or the screw type or a die of the screw type may be combined with a mandrel of the T-type or screw type. Furthermore, a die of the T-type may be combined with a mandrel of the screw type.

What is claimed as new and desired to be secured by Letters Patent is;

1. An apparatus for producing a light structural board of thermoplastic resin, comprising, in combination, first and second sources of heat-plastified thermoplastic resin, first and second passage means leading respectively from said first and second sources and extending in directions which are substantially perpendicular to each other, a die formed with an elongated cavity having an inlet end which leads from said first passage means and an outlet end located opposite to and substantially in line with said inlet end and extending in a slot form which is substantially perpendicular to said first passage means, a mandrel positioned within said elongated cavity in the die and formed with an elongated cavity leading from said second passage means and extending in a direction substantially parallel to said outlet end of the cavity in the die, said mandrel being further formed with at least one discharge passageway leading from said cavity in the mandrel and terminating in proximity to and in parallel to said outlet end of the cavity in the die, the die and mandrel defining therebetween a pair of discharge passageways forming part of said cavity in the die and spaced apart from each other across the mandrel for forming a pair of spaced parallel slots in proximity to an outlet end of said discharge passageway in the mandrel, and a plurality of rib-forming elements located in proximity to said slots between the die and mandrel and to the outlet end of the discharge passageway in the mandrel.

2. An apparatus as set forth in claim 1, in which said rib-forming elements are fast on opposed outer surfaces of said mandrel and include a plurality of teeth projecting into said spaced passageways between the die and mandrel and extending close to said slots in directions substantially perpendicular to the slots and to the outlet end of the discharge passageway in said mandrel.

3. An apparatus as set forth in claim 1, in which said rib-forming elements are fast on those surfaces of said mandrel which define said outlet of the discharge passageway in the mandrel, said rib-forming elements being formed with slots which are spaced apart from each other in a direction parallel to said slots at the outlet ends of said discharge passageways between the die and mandrel and which extend in directions substantially perpendicular to the slots at the outlet ends of the discharge passageways.

4. An apparatus as set forth in claim 1, further comprising stream-diverting means disposed within said elongated cavity in the die and located upstream of said mandrel for positively diverting into said discharge passageways on both sides of the mandrel a stream of heat-plastified thermoplastic resin delivered into said elongated cavity in the die through said inlet end of the die.

5. An apparatus as set forth in claim 4, in which said stream-diverting means comprise a wall portion forming part of said mandrel and having surfaces which are respectively curved toward said discharge passageways.

6. An apparatus as set forth in claim 1, further comprising adjusting means for adjusting spacings between the inner and outer surfaces of said die and mandrel, respectively, defining said slots.

7. An apparatus as set forth in claim 1, in which said at least one discharge passageway in said mandrel is enlarged toward its forward end.

8. An apparatus as set forth in claim 2, in which said teeth on one of said outer surfaces of the mandrel are substantially in alignment with the teeth on the other outer surface of the mandrel.

9. An apparatus as set forth in claim 2, in which said teeth project substantially perpendicularly from said outer surfaces of the mandrel.

10. An apparatus as set forth in claim 2, in which said teeth are inclined to said outer surfaces of the mandrel.

11. An apparatus as set forth in claim 2, in which said teeth on one of said outer surfaces of the mandrel are located in staggered relation to the teeth on the other outer surface of the mandrel.

12. An apparatus as set forth in claim 3, in which said slots formed by said rib-forming elements are substantially parallel to each other and are substantially normal to the inner surfaces of said die.

13. An apparatus as set forth in claim 3, in which said slots formed by said rib-forming elements are inclined to the inner surfaces of said die.

* * * * *